(12) United States Patent
Aritome et al.

(10) Patent No.: US 11,747,300 B2
(45) Date of Patent: Sep. 5, 2023

(54) CAPILLARY ARRAY UNIT

(71) Applicant: Hitachi High-Tech Corporation, Tokyo (JP)

(72) Inventors: Katsuhiro Aritome, Tokyo (JP); Takeshi Ooura, Tokyo (JP); Shunichi Kariya, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 345 days.

(21) Appl. No.: 17/271,294

(22) PCT Filed: Sep. 2, 2019

(86) PCT No.: PCT/JP2019/034342
§ 371 (c)(1),
(2) Date: Feb. 25, 2021

(87) PCT Pub. No.: WO2020/050193
PCT Pub. Date: Mar. 12, 2020

(65) Prior Publication Data
US 2021/0341419 A1     Nov. 4, 2021

(30) Foreign Application Priority Data
Sep. 3, 2018 (JP) ................................ 2018-164169

(51) Int. Cl.
*G01N 27/453* (2006.01)
*G01N 30/60* (2006.01)
*G01N 27/447* (2006.01)

(52) U.S. Cl.
CPC . *G01N 27/44704* (2013.01); *G01N 27/44791* (2013.01); *G01N 30/6047* (2013.01)

(58) Field of Classification Search
CPC ....... G01N 27/44704; G01N 27/44791; G01N 30/466; G01N 30/467; G01N 30/6043; G01N 30/6047
See application file for complete search history.

(56) References Cited

U.S. PATENT DOCUMENTS 5,900,132 A * 5/1999 Keenan ............ G01N 27/44721
204/603
6,017,765 A * 1/2000 Yamada ........... G01N 27/44782
204/604

(Continued)

FOREIGN PATENT DOCUMENTS

CN     107735678 A     2/2018
JP     2000-321244 A   11/2000

(Continued)

OTHER PUBLICATIONS

English language translation of the Written Opinion for International application No. PCT/JP2019/034342, dated Oct. 15, 2019 (Year: 2019).*

(Continued)

*Primary Examiner* — Alexander S Noguerola
(74) *Attorney, Agent, or Firm* — BAKER BOTTS L.L.P.

(57) ABSTRACT

Provided is a capillary array unit configured to facilitate attaching/detaching operation. A capillary array unit includes a capillary, a load header provided at one end of the capillary, a capillary head provided at the other end of the capillary, a detection section provided at a portion of the capillary, and a holder holding the capillary. The holder includes a first holding section holding the capillary in a curved shape, a second holding section linearly holding the capillary, and a guide to move the second holding section in a predetermined direction.

8 Claims, 7 Drawing Sheets

(56) References Cited

U.S. PATENT DOCUMENTS

| | | | |
|---|---|---|---|
| 6,251,343 B1 * | 6/2001 | Dubrow | B01L 3/5085 |
| | | | 422/68.1 |
| 6,428,670 B1 | 8/2002 | Hayashizaki et al. | |
| 2006/0219559 A1 | 10/2006 | Ugai et al. | |
| 2009/0183990 A1 * | 7/2009 | Shoji | G01N 27/44782 |
| | | | 204/603 |
| 2017/0016853 A1 * | 1/2017 | Maher | G01N 27/44791 |
| 2019/0041359 A1 | 2/2019 | Nakazawa et al. | |
| 2021/0164937 A1 | 6/2021 | Okuno et al. | |

FOREIGN PATENT DOCUMENTS

| | | | | |
|---|---|---|---|---|
| JP | 2006-284530 A | 10/2006 | | |
| JP | 2007-052034 A | 3/2007 | | |
| JP | 2009-174897 A | 8/2009 | | |
| WO | WO 9938005 A1 * | 7/1999 | | G01N 27/447 |
| WO | WO 2017/158811 A1 | 9/2017 | | |
| WO | WO 2018156880 A * | 8/2018 | | G01N 27/447 |

OTHER PUBLICATIONS

Office Action, dated Oct. 11, 2022, for Chinese Application No. 201980056963.4 (with English translation).
International Search Report, dated Oct. 15, 2019, for International Application No. PCT/JP2019/034342.

\* cited by examiner

CAPILLARY ARRAY UNIT

TECHNICAL FIELD

The present invention relates to a capillary array unit.

BACKGROUND ART

The capillary electrophoresis is widely used as a technique for separating and analyzing a wide variety of biological samples including deoxyribonucleic acid (DNA). One technical advantage of the capillary electrophoresis is its high heat radiation characteristics caused by a high surface-to-volume ratio of a capillary. Such high heat radiation characteristics enable high-speed and high-resolution sample separation by high-voltage electrophoresis.

Japanese Unexamined Patent Application Publication No. 2009-174897 discloses a method for easily attaching the capillary array to a capillary electrophoresis apparatus by fixing a rigid capillary array to one frame.

CITATION LIST

Patent Literature

Patent Literature 1: Japanese Unexamined Patent Application Publication No. 2009-174897.

SUMMARY OF INVENTION

Technical Problem

For the electrophoresis apparatus, a user changes the capillary array depending on a type of a sample or an application.

In the past, a capillary normally hangs down due to weight of a detection unit or an array head. In particular, a capillary array having low rigidity hangs down noticeably. If such a capillary array is mounted directly, the detection unit or a pump may come into contact with the apparatus, leading to breakage of the capillaries. To correct such hanging, therefore, the user typically attaches or detaches the capillary array while holding the capillaries with both hands and bending the capillaries. Such an attaching/detaching operation with bending has been a burden on the user.

The invention aims to provide a capillary array unit configured to simplify the attaching/detaching operation of the capillary array by keeping a capillary array in a form, which prevents a capillary from being damaged regardless of rigidity of the capillary, during attaching/detaching operation of the capillary array to/from an apparatus.

Solution to Problem

A capillary array unit of the invention includes a capillary, a load header provided at one end of the capillary, a capillary head provided at the other end of the capillary, a detection unit provided at a portion of the capillary, and a holder holding the capillary. The holder includes a first holding section holding the capillary in a curved shape, a second holding section linearly holding the capillary, and a guide to move the second holding section in a predetermined direction.

Advantageous Effects of Invention

According to the invention, attaching/detaching operation of the capillary array is simplified.

DESCRIPTION OF EMBODIMENT

Figure 1:
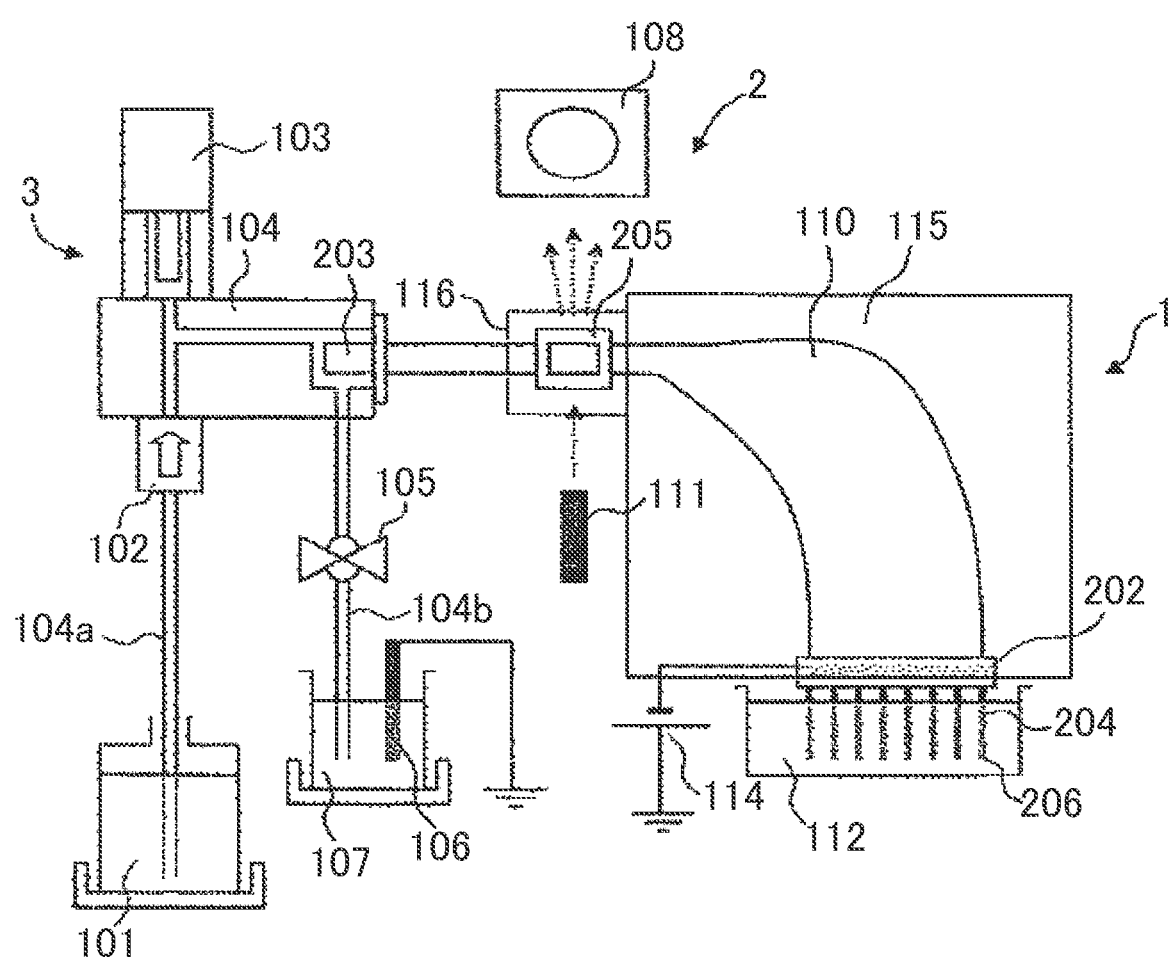
FIG. 1 illustrates a basic configuration of a capillary electrophoresis apparatus according to the invention.

FIG. 1 is a schematic view of a basic configuration of a capillary electrophoresis apparatus. The capillary electrophoresis apparatus includes a capillary electrophoresis unit 1 containing one or more capillary, an optical detection unit 2 that optically detects a sample separated by an electrophoresis medium in the capillary, and a polymer injection mechanism 3 that injects a high-viscosity polymer solution (hereinafter, simply referred to as polymer) as the electrophoresis medium into the capillary.

The capillary electrophoresis unit 1 includes a capillary array 110, an oven (constant temperature oven) 115, a buffer container 112, and a high-voltage power supply 114.

The capillary array 110 includes one or more capillary. The capillary includes a quartz pipe with an outer sheath coated with polyimide resin. Examples of the capillary include a rigid capillary having an outer diameter of 320 µm and an inner diameter of 50 µm and covered with a polyimide coating 20 µm in thickness, and a flexible capillary having an outer diameter of 125 µm and an inner diameter of 50 µm and covered with a polyimide coating 12.5 µm in thickness. Thus, the polyimide coating has an outer diameter of 360 µm.

One end of the capillary array 110 forms a capillary head 203 including capillaries bundled and bonded together. The other end of the capillary array 110 is held by a load header 202. The load header 202 is fixed to an oven 115.

The load header 202 has at least one tubular cathode 204. The capillary penetrates the cathode 204 and projects from a lower end of the cathode 204. In this way, a cathode-side end 206 of the capillary is immersed in a buffer solution in the buffer container 112.

The oven 115 accommodates the capillary array 110 and regulates temperature of the capillary array 110. A Peltier device is used as a heat source of the oven 115, which allows temperature setting from a temperature lower than room temperature to a high temperature of 50° C. or higher.

The polymer injection mechanism 3 includes a pump 103 having a plunger, a block 104 having a channel therein, a polymer container 101 storing a polymer, and a buffer container 107 storing a buffer solution. An anode 106 is immersed in the buffer solution in the buffer container 107. The channel in the block 104 has an inner diameter of 0.5 to 2 mm, which is several to several tens of times larger than the inner diameter of the capillary. The reason for this is to avoid voltage loss during electrophoresis.

The block 104 is connected to the pump 103, the capillary head 203, and two pipes 104a and 104b. The pump 103, the capillary head 203, and the two pipes 104a and 104b are connected to one another through the channel in the block 104. The first pipe 104a connects between the block 104 and the polymer in the polymer container 101. The first pipe 104a has a check valve 102. A second pipe 104b connects between the block 104 and the buffer solution in the buffer container 107. The second pipe 104b has an electromotive buffer valve 105.

The polymer container 101 stores a necessary and sufficient volume of polymer for continuous operation. The polymer container 101 can flexibly vary its shape to prevent its internal pressure from becoming negative pressure even if the polymer is sucked from the polymer container 101. The polymer container 101 is disposed lower than the buffer container 107. The reason for this is to avoid backflow of the polymer from the polymer container 101 into the buffer container 107 by a pressure caused by a level difference. On the other hand, backflow of the polymer or the buffer solution into the polymer container 101 is blocked by the check valve 102. Levels of the buffer solutions in the two buffer containers 112 and 107 are maintained on the same level.

When the polymer is injected into the capillary of the capillary array 110, the electromotive buffer valve 105 is closed. This in turn closes the channel between the capillary array 110 and the buffer container 107. The pump 103 is driven to inject the polymer from within the polymer container 101 into the capillary. For electrophoresis, the buffer valve 105 is opened so that the channel communicates between the capillary array 110 and the buffer container 107.

The optical detection unit 2 includes a light source 111 and an optical detector 108. The optical detection unit 2 is disposed in a detection section 205 provided in the capillary array 110. The detection section 205 is mounted in a detection section holder 116. The light source 111 generates laser light as excitation light. In the detection section 205, the capillary is not covered with the coating and the quartz pipe is exposed. The excitation light from the light source 111 irradiates a detection object moving by electrophoresis within the capillary in the detection section 205. The detection object emits fluorescence. The fluorescence is detected by the optical detector 108.

Electrophoresis is now described. While omitted in FIG. 1, an autosampler is provided to carry a sample tray and the buffer container 112. The autosampler disposes the sample tray at the cathode-side end 206 of the capillary. First, the sample tray is disposed under the cathode-side end 206 of the capillary and then raised. The sample tray has many wells each housing a sample including a fluorescently-labeled test object such as DNA. The cathode-side end 206 of the capillary 201 is immersed in the sample in the well of the sample tray. Subsequently, a high voltage of about several kilovolts is applied between the anode 106 and the cathode 204 by the high-voltage power supply 114. The fluorescently-labeled detection object such as DNA is introduced into the capillary via the cathode-side end 206 of the capillary. Subsequently, the cathode-side end 206 of the capillary is immersed in the buffer container 112 as illustrated in FIG. 1. The detection object is separated while moving within the capillary. The fluorescently-labeled detection object is irradiated with the excitation light from the light source 111 while passing through the detection section 205. The detection object emits fluorescence in response to the excitation light. The fluorescence is detected by the optical detector 108.

Operation of the polymer injection mechanism is now described. With the pump 103, description is given assuming a pushing direction of the plunger into a chamber is a normal rotation direction of the motor and a pulling direction of the plunger is a reverse rotation direction of the motor. First, the buffer valve 105 is closed. Subsequently, the motor is reversely rotated. The plunger is pulled, and the polymer in the polymer container 101 is sucked into the chamber of the pump 103 through the channel in the block 104. Subsequently, the motor is normally rotated. The plunger is pushed, and the polymer in the chamber of the pump 103 is pushed into the channel in the block 104. At this time, the check valve 102 operates to prevent the polymer in the chamber of the pump 103 from flowing back into the polymer container 101. As a result, the polymer flows into the capillary through the channel in the block 104, and flows out from the cathode-side end 206 of the capillary. Finally, the buffer valve 105 is opened for electrophoresis.

Figure 2A:
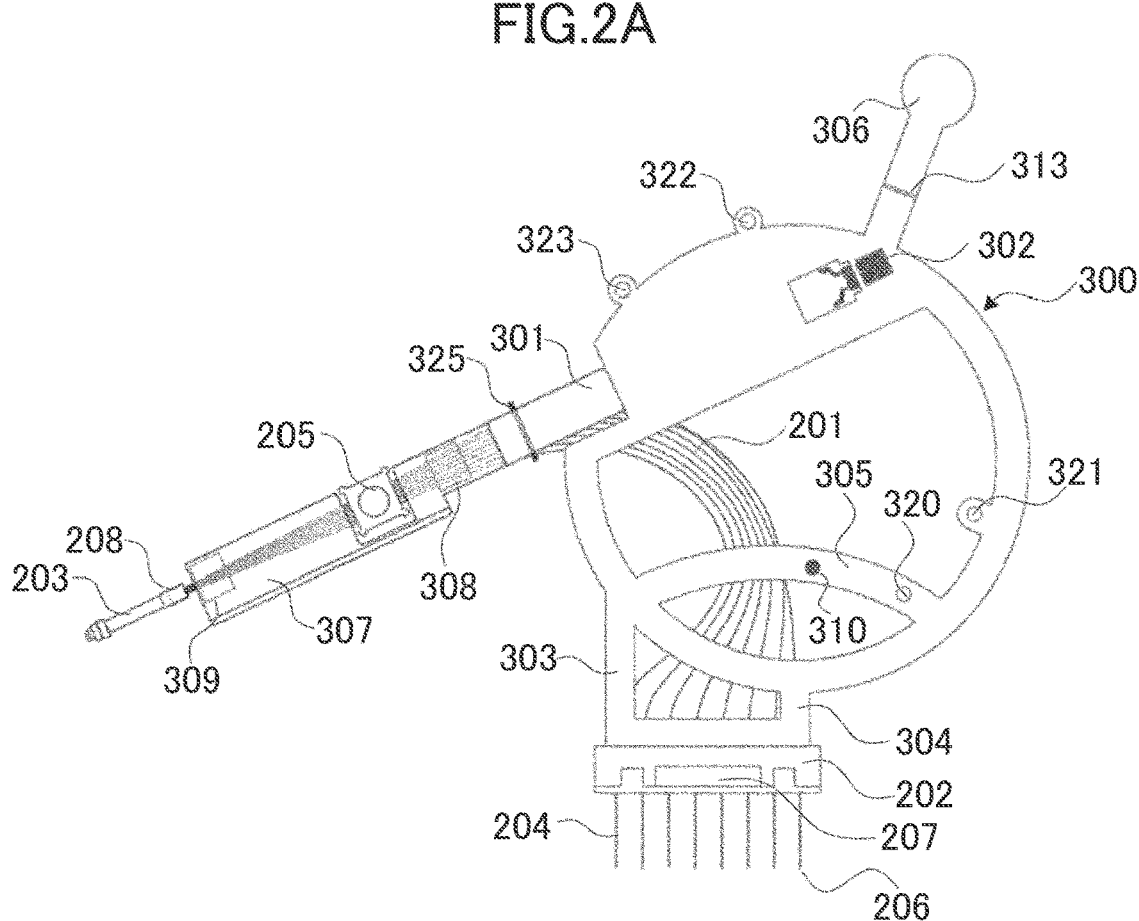
FIG. 2A is a front view of a capillary array unit of the invention.
Figure 2B:
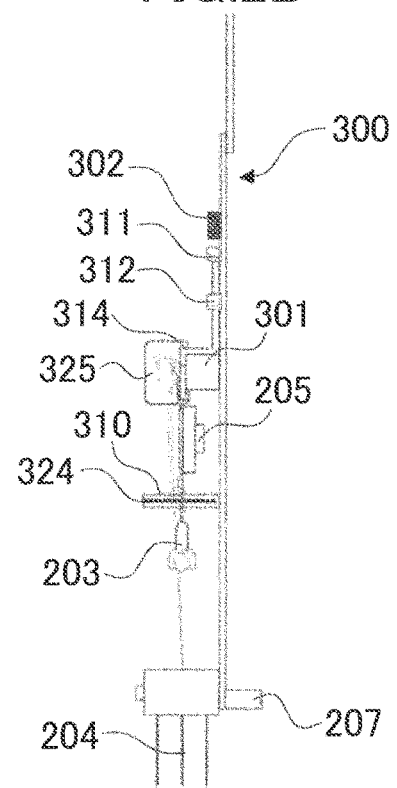
FIG. 2B is a side view of the capillary array unit of the invention.

An embodiment of the capillary array unit of the invention is now described with reference to FIGS. 2A, 2B, and 2C. FIG. 2A illustrates a front configuration of the capillary array unit of this embodiment, and FIG. 2B illustrates a side configuration thereof. The embodiment shows a case where the capillary has a length of 28 cm from the load header to the detection section. The capillary array unit of the embodiment includes the capillary array 110, a first frame 300 holding the capillary array 110, a second frame 301, a fixture 302 to detachably fix the second frame, and guides 311 and 312. As illustrated in FIG. 2A, the first frame 300 has a first leg 303, a second leg 304, a bridge 305, and a supporter 313. The frame 300 is configured to hold the capillary array 110. The two legs 303 and 304 are fixed to the load header 202. The supporter 313 is connected to a capillary management tag 306. One end of the capillary array 110 forms the capillary head 203 including the capillaries bundled and bonded together. The other end, i.e., the cathode-side end, of the capillary array 110 is held by the tubular electrodes provided on the load header 202.

The first frame 300 has a shaft 310. As illustrated in FIG. 2B, the shaft 310 extends orthogonal to a surface configuring the first frame 300. A separator 324 is attached to the shaft 310. The second frame 301 has a slit 314. The slit 314 includes a groove perpendicular to a surface configuring the second frame 301. A separator 325 is provided in the slit 314.

Figure 2C:
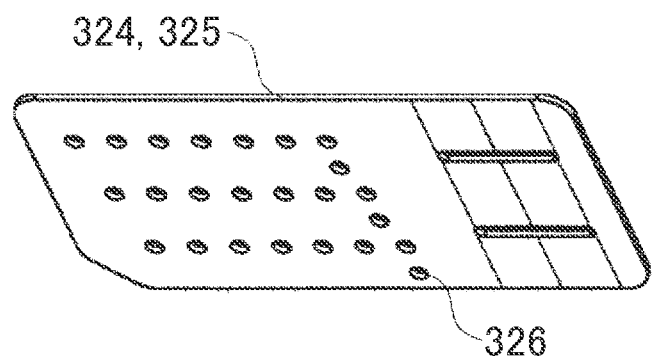
FIG. 2C illustrates a separator.

The separators 324 and 325 each have a film or sheet shape, and have holes 326, the number of which is equal to or larger than the number of the capillaries (see FIG. 2C). The inner diameter of the hole 326 is, for example, about 1 mm, which is slightly larger than the outer diameter of the capillary. Each capillary penetrates one hole. Any capillary thus penetrates the hole 326 of the separator and is kept in a certain shape. The second frame is disposed so as to prevent hanging due to gravity acting on the capillary head and the detection section, and keeps the capillary array 110 in a certain form so as to prevent the capillaries from being damaged during attaching/detaching operation of the capillary array 110.

The separators 324 and 325 separate the capillaries from each other and prevent the capillaries from being entangled with one another and thickening into a bundle. In this embodiment, a plurality of separators are disposed, and the capillaries are passed through the separators so as to twist in a crossing manner between adjacent separators. Such a three-dimensional crossing form prevents the capillaries from coming into contact with each other even in the case of short capillaries.

The number of the separators may be increased or decreased depending on the length of the capillary. The number of the separators is typically increased with an increase in the length of the capillary. In case of a capillary length of 36 cm, for example, shafts are provided in respective shaft holes 320 and 322 of the bridge and the first frame 300, and the separators are attached to the shafts. In case of a capillary length of 50 cm, shafts are provided in respective shaft holes 321, 322, and 323 of the first frame 300, and the separators are attached to the shafts.

The capillary array 110 includes a plurality of capillaries 201. In this embodiment, the capillary array 110 includes eight capillaries 201.

The second frame 301 is linearly movable along the guides 311 and 312 provided in the first frame 300. The second frame 301 is connected to a plate 307. The capillaries 201 are affixed to the plate 307 with capillary fixing tapes 308 and 309 so that the capillaries 201 are restrained so as not to hang down due to gravity. The plate 307 is folded at a plurality of points to increase rigidity. The plate 307 and the capillary fixing tapes 308 and 309 are each desirably thin and high in thermal conductivity to keep capillary temperature constant during electrophoresis. The plate 307 is a resin sheet about 0.1 to 0.5 mm thick. The capillary fixing tapes 308 and 309 are each a one-side adhesive tape about 0.02 to 0.2 mm thick.

Figure 3A:
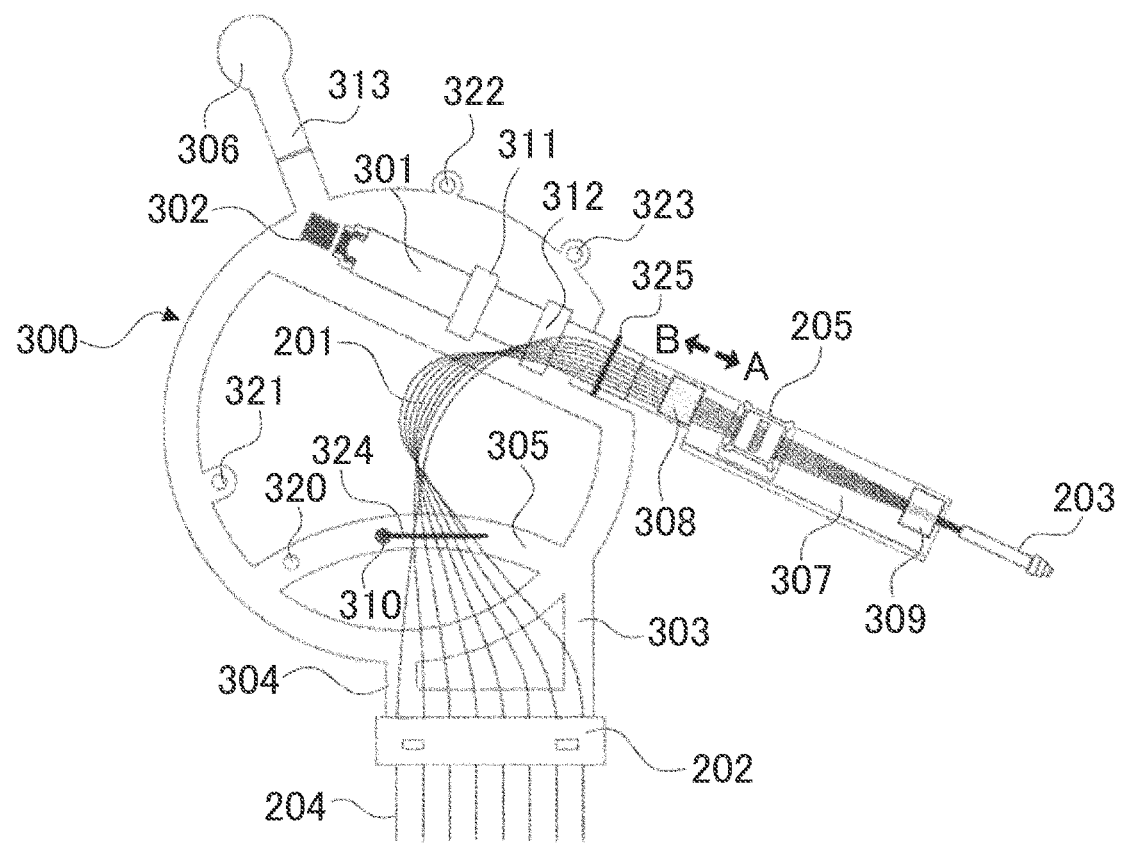
FIG. 3A illustrates a capillary array unit of which the second frame is fixed by a fixture.
Figure 3B:
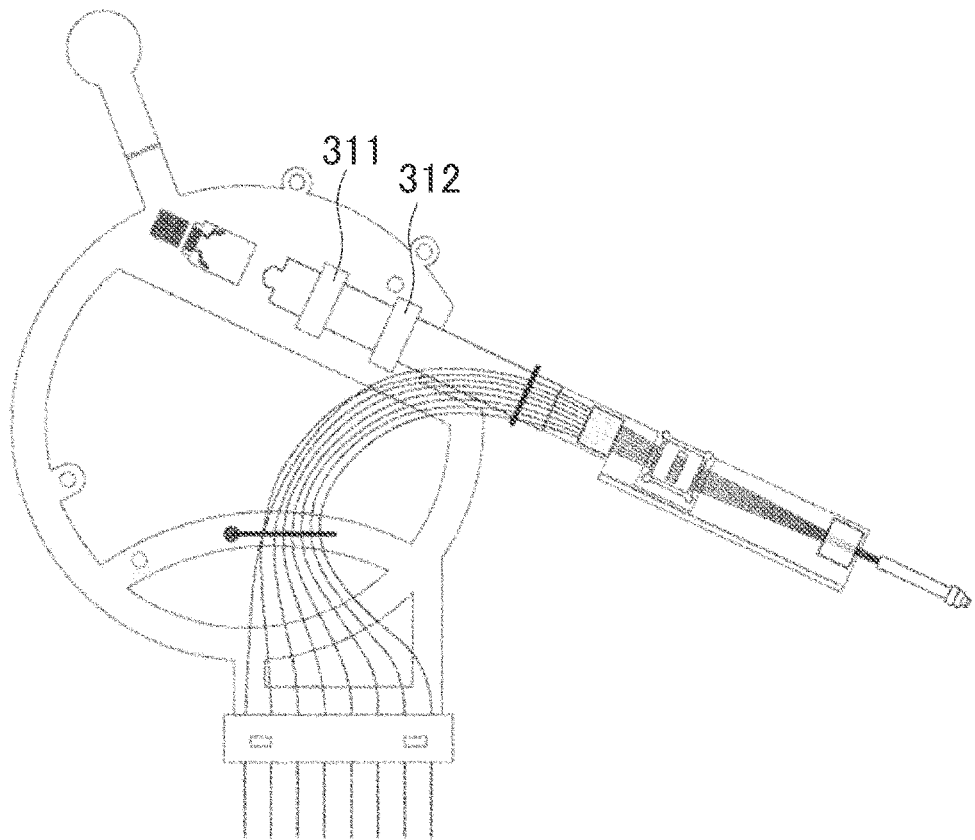
FIG. 3B illustrates a shape of the capillary array unit of which the capillary head is connected to a pump mechanism.

Motion of the second frame 301 of the capillary array unit of the invention is now described with reference to FIGS. 3A and 3B. FIG. 3A corresponds to an appearance of FIG. 2A as viewed from the opposite side. A linear portion 110A of the capillary array is disposed by the second frame 301, the separator 325 provided in the second frame 301, the plate 307 connected to the second frame 301, and the capillary fixing tapes 308 and 309. The capillary head 203, the detection section 205, the separator 325, the second frame 301, a second frame fixture 302, and the plate 307 are disposed on a straight line. When the capillary head 203 receives external force in a direction shown by an arrow A, the second frame 301 is unfixed from the second frame fixture 302 and linearly moves along the guides 311 and 312 in the direction shown by the arrow A. As a result, the capillary head 203 is connected to a mount of the block 104 of the polymer injection mechanism 3, resulting in a state as illustrated in FIG. 3B. In this state, when the capillary head 203 receives external force in a direction shown by an arrow B, the capillary head 203 is disconnected from the block 104 and linearly moves along the guides 311 and 312 for the second frame 301 in a direction shown by an arrow B. The second frame 301 is thus restrained by the second frame fixture 302, resulting in a state as illustrated in FIG. 3A.

Figure 4:
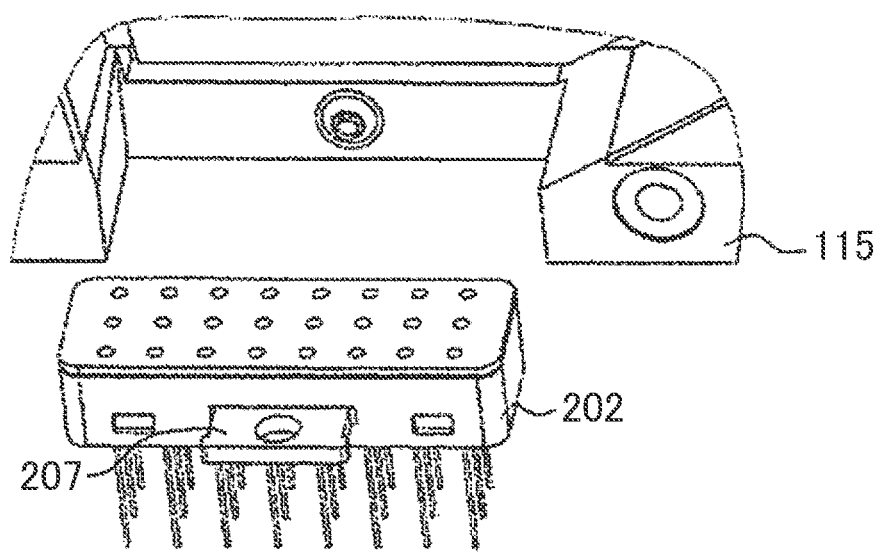
FIG. 4 illustrates an aspect where a load header of the invention is mounted on an oven.
Figure 5:
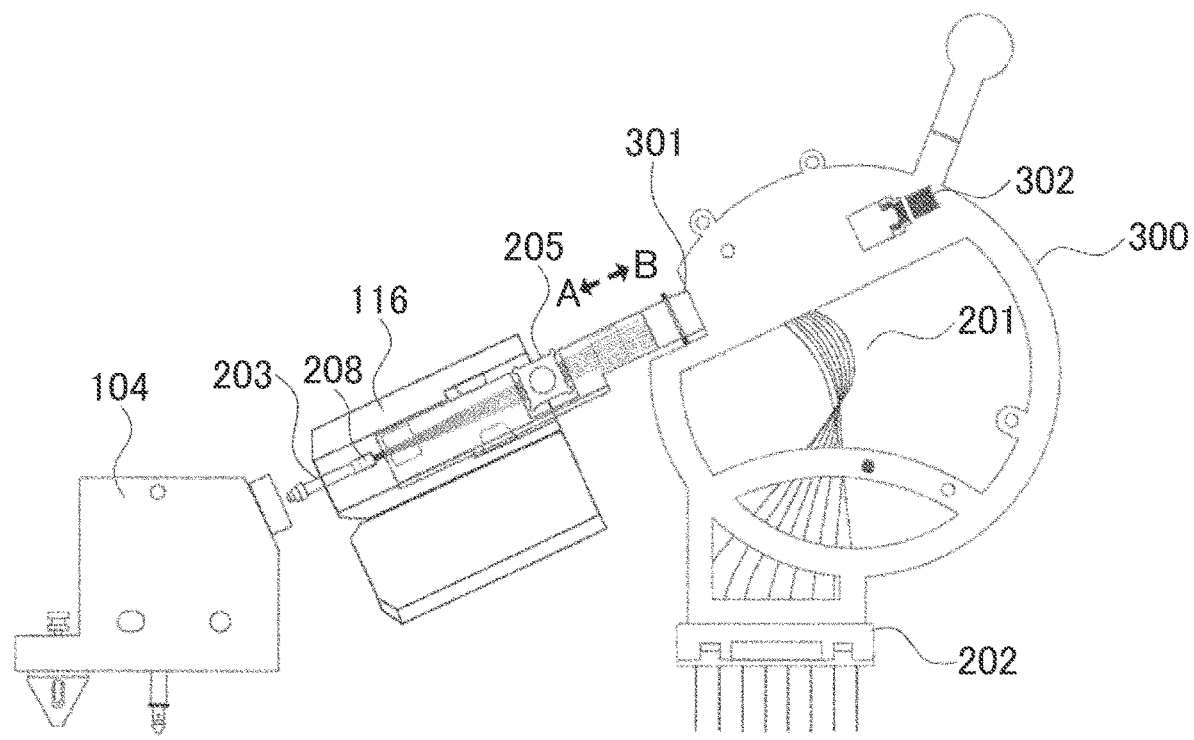
FIG. 5 illustrates the capillary array unit after a load header of the capillary electrophoresis apparatus of the invention has been mounted.

A mounting procedure of the capillary array 110 of the invention is now described with reference to FIGS. 4, 5, 6A, and 6B. First, the load header 202 is mounted on the oven 115. This is described with reference to FIG. 4. FIG. 4 illustrates part of a lower end of the oven 115 and the load header 202. The capillary array mounted on the load header 202 is not illustrated. The load header 202 has a grip 207. A user grasps the grip 207 to insert the load header 202 into a recess of the oven 115. A groove is provided on either side of the load header 202, and a projection is provided on the inside of the recess of the oven 115. When the load header 202 is inserted in the recess of the oven 115, the groove of the load header 202 comes in engagement with the projection on the recess of the oven 115. As illustrated in FIG. 5, the second frame 301 is held by the second frame fixture 302; hence, the capillary head 203 and the detection section 205 each interfere with no part of the electrophoresis apparatus. This operation is therefore easily performed only by inserting the load header 202 into the recess of the oven 115 while grasping the grip 207.

FIG. 5 illustrates a state where the load header 202 is mounted on the oven 115. The shape of the capillary array 110 as illustrated in FIGS. 2A and 3A is directly maintained. In this embodiment, the capillary head 203 is disposed in the vicinity of the mount of the block 104 of the polymer injection mechanism 3. The detection section 205 is disposed in the vicinity of a mount of the detection section holder 116.

Figure 6A:
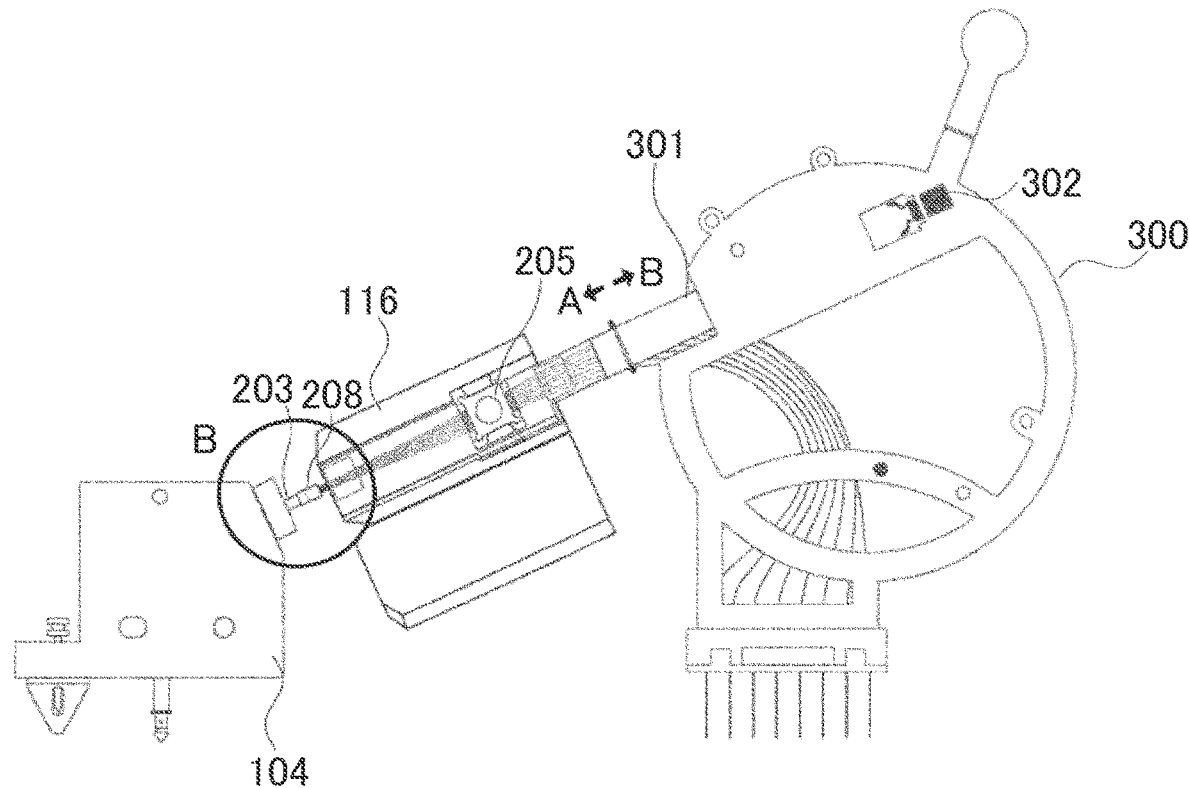
FIG. 6A illustrates the capillary array unit after a capillary head of the invention has been mounted.

FIG. 6A illustrates a state where the capillary head 203 is mounted on the block 104 of the polymer injection mechanism 3. To mount the capillary head 203 on the block 104, the second frame 301 is linearly moved along the guides. As a result, the capillary head 203 penetrates a hole of the block 104 and is mounted on the polymer injection mechanism 3. A grip 208 is provided near the load header. A user can move the second frame while grasping the grip 208 and thus can mount the capillary head 203 on the block without directly touching any capillary. This is described in detail with reference to FIG. 6B. In this case, as described with reference to FIG. 3B, the second frame is linearly moved along the guides, so that the capillary head 203 penetrates the hole of the block 104. Subsequently, a set screw 701 provided on the block 104 is screwed to press a sealing surface 702 of the capillary head 203 against the block 104. This results in sealing between the capillary head 203 and the block 104, so that the capillary head 203 is fixed to the block 104. As illustrated in FIG. 5, the capillary head 203 is disposed in the vicinity of the mount of the block 104 of the polymer injection mechanism 3. In this operation, the capillary head 203 can be inserted into the hole of the block 104 and thus easily mounted only by moving the second frame 301 along the guides 311 and 312.

Figure 6B:
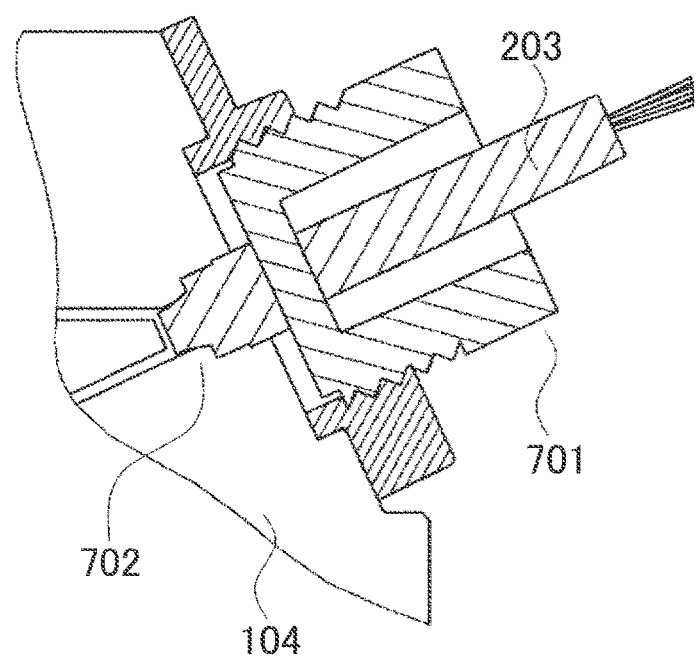
FIG. 6B illustrates a detailed aspect where the capillary head of the invention is mounted on a block.

Finally, the detection section 205 is mounted on the detection section holder 116. As illustrated in FIG. 6B, when the capillary head 203 is connected to the block 104 of the polymer injection mechanism 3, the detection section 205 is disposed in the mount of the detection section holder 116. Hence, the detection section 205 can be easily mounted in the detection section holder 116 only by closing a detection section holder cover 117.

A procedure of detaching the capillary array of the invention is now described with reference to FIGS. 4, 5, 6A, and 6B.

The detection section holder cover 117 is first opened to unfix the detection section 205, and then the capillary head 203 is detached from the block 104 of the polymer injection mechanism 3. This is described with reference to FIG. 6B. The set screw 701 is unscrewed to release the force pressing the capillary head 203. Subsequently, the second frame 301 is linearly moved along the guides 311 and 312 to extract the capillary head 203 from the hole of the block 104. At this time, as described with reference to FIG. 3, the second frame 301 is linearly moved along the guides 311 and 312 and thus restrained by the second frame fixture 302. At that point, the detection section 205 is already unfixed; hence, as illustrated in FIG. 5, the detection section is also detached from the mount of the detection section holder 116 by moving the second frame 301 toward the second frame fixture 302 side. This operation is therefore easily performed only by moving the second frame 301 along the guides 311 and 312.

Finally, the load header 202 is detached from the oven 115. This is described with reference to FIG. 4. FIG. 4 illustrates part of a lower end of the oven 115 and the load header 202. The capillary array mounted on the load header is not illustrated. The load header 202 has the grip 207. A user grasps the grip 207 to detach the load header 202 from the oven 115. When the load header is detached, the second frame 301 is held by the second frame fixture 302 as illustrated in FIG. 5; hence, the capillary head 203 and the detection section 205 each interfere with no part of the apparatus. This operation is therefore easily performed only by detaching the load header 202 from the oven 115 while grasping the grip 207.

As described hereinbefore, according to this embodiment, while a user attaches or detaches the capillary array 110 to/from the electrophoresis apparatus, the user need not bend the capillaries. Thus, the user can easily attach or detach the capillary array. The user therefore can easily replace the capillary array.

Although one embodiment of the invention has been described hereinbefore, the invention should not be limited thereby, and it will be readily understood by those skilled in the art that various modifications and alterations may be made within a scope of the invention described in claims.

LIST OF REFERENCE SIGNS

1 Capillary electrophoresis unit
2 Optical detection unit
3 Polymer injection mechanism
101 Polymer container
102 Check valve
103 Pump
104 Block
105 Buffer valve
106 Electrode
107 Buffer container
108 Optical detector
110 Capillary array
111 Light source
112 Buffer container
113 Electrode
114 High-voltage power supply
115 Oven
116 Detection section holder
117 Detection section holder cover
201 Capillary
202 Load header
203 Capillary head
204 Cathode
205 Detection section
206 Cathode-side end
207 Load header grip
208 Grip
300 First frame
301 Second frame
302 Fixture
303 First leg
304 Second leg
305 Bridge
306 Capillary management tag
307 Plate
308, 309 Capillary fixing tape
310 Shaft
311, 312 Guide
313 Supporter
314 Slit
310, 320, 321, 322, 323 Shaft hole
324, 325 Separator
326 Hole
701 Set screw
702 Sealing surface

The invention claimed is:

1. A capillary array unit, comprising:
a capillary;
a load header provided at one end of the capillary;
a capillary head provided at the other end of the capillary;
a detection section provided at a portion of the capillary; and
a holder holding the capillary;
wherein the holder includes a first holding section holding the capillary in a curved shape, a second holding section linearly holding the capillary, and a guide to move the second holding section in a predetermined direction,
wherein:
the holder includes a fixture to detachably fix a second frame on one end of the second frame,
the fixture and the second frame are aligned in a straight line so that the fixture is configured to be attachable and detachable on the one end of the second frame as a result of an external force being applied in the straight line of alignment.

2. The capillary array unit according to claim 1, further comprising a plurality of capillaries, and a separator to hold the plurality of capillaries in a state of being separated from each other.

3. The capillary array unit according to claim 2, further comprising a plurality of separators, wherein the plurality of separators are disposed, and
the plurality of capillaries pass through at least one of the separators so as to twist in a crossing manner between adjacent separators.

4. The capillary array unit according to claim 1, wherein the second holding section is configured of a slide section moving along a guide, and a plate section linearly holding the capillary.

5. The capillary array unit according to claim 4, wherein the plate section has a high thermal conductivity.

6. The capillary array unit according to claim 4, wherein the plate section is partially bent.

7. The capillary array unit according to claim 4, wherein the capillaries are fixed to the plate section by a tape.

8. The capillary array unit according to claim 7, wherein the tape has a high thermal conductivity.

* * * * *